United States Patent
Gong et al.

(10) Patent No.: US 11,831,713 B2
(45) Date of Patent: Nov. 28, 2023

(54) DISTRIBUTED SERVICE SCHEDULING METHOD AND RELATED APPARATUS

(71) Applicant: Huawei Technologies Co., Ltd., Shenzhen (CN)

(72) Inventors: Junsong Gong, Hangzhou (CN); Shan He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/802,717

(22) PCT Filed: Feb. 19, 2021

(86) PCT No.: PCT/CN2021/076812
§ 371 (c)(1),
(2) Date: Aug. 26, 2022

(87) PCT Pub. No.: WO2021/169847
PCT Pub. Date: Sep. 2, 2021

(65) Prior Publication Data
US 2023/0123223 A1    Apr. 20, 2023

(30) Foreign Application Priority Data
Feb. 29, 2020   (CN) .................. 202010132849.X

(51) Int. Cl.
*H04L 67/1095* (2022.01)
*H04L 67/51* (2022.01)

(52) U.S. Cl.
CPC .......... *H04L 67/1095* (2013.01); *H04L 67/51* (2022.05)

(58) Field of Classification Search
None
See application file for complete search history.

(56) References Cited

U.S. PATENT DOCUMENTS

| 7,398,533 B1 | 7/2008 | Slaughter et al. |
| 9,182,989 B1 | 11/2015 | Bokka |

(Continued)

FOREIGN PATENT DOCUMENTS

| CN | 101102248 A | 1/2008 |
| CN | 103905511 A | 7/2014 |

(Continued)

OTHER PUBLICATIONS

Song et al., "A Programming Model for Reliable and Efficient Edge-Based Execution under Resource Variability", Jul. 1, 2019, IEEE, 2019 IEEE International Conference on Edge Computing (EDGE) (pp. 64-71) (Year: 2019).*

(Continued)

*Primary Examiner* — Davoud A Zand
(74) *Attorney, Agent, or Firm* — SLATER MATSIL, LLP

(57) ABSTRACT

A distributed service scheduling method, including obtaining, by a first terminal, an invocation request for a first service, determining whether the first terminal locally supports the first service, determining, by the first service, in response to the first terminal not locally supporting the first service, whether a local database comprises service information of the first service, determining, in response to the first terminal locally supporting the first service, identifier information of the first service and a second terminal that supports the first service, sending the identifier information of the first service and the invocation request to the second terminal, wherein the identifier information of the first service is used by the second terminal to match the first service, and receiving, by the first terminal, a result of executing the first service by the second terminal based on the invocation request.

20 Claims, 10 Drawing Sheets

(56) References Cited

U.S. PATENT DOCUMENTS

| | | | |
|---|---|---|---|
| 9,198,215 B2* | 11/2015 | Gantman | H04W 48/20 |
| 10,742,421 B1* | 8/2020 | Wentz | H04L 9/0897 |
| 2003/0191842 A1 | 10/2003 | Murphy et al. | |
| 2006/0245383 A1 | 11/2006 | Ansari et al. | |
| 2013/0191518 A1 | 7/2013 | Narayanan et al. | |
| 2015/0142602 A1 | 5/2015 | Williams et al. | |
| 2015/0146716 A1* | 5/2015 | Olivier | H04L 65/80 370/352 |
| 2018/0070370 A1* | 3/2018 | Emori | H04W 4/50 |
| 2018/0287891 A1 | 10/2018 | Shaw et al. | |
| 2019/0251536 A1* | 8/2019 | Muller | G06F 9/54 |

FOREIGN PATENT DOCUMENTS

| | | |
|---|---|---|
| CN | 104202427 A | 12/2014 |
| CN | 105245500 A | 1/2016 |
| CN | 105681463 A | 6/2016 |
| CN | 105991694 A | 10/2016 |
| CN | 107729210 A | 2/2018 |
| CN | 109257396 A | 1/2019 |
| CN | 109688548 A | 4/2019 |
| CN | 109831361 A | 5/2019 |
| CN | 110798358 A | 2/2020 |
| KR | 20180041356 A | 4/2018 |
| WO | 2018108032 A1 | 6/2018 |

OTHER PUBLICATIONS

Zhai, M. et al., "Architecture and Key Technologies of Wide-area Distibuted Real-time Database System for Power Dispatching Automation System," vol. 37, No. 2, Automation of Electric Power Systems, Jan. 25, 2013, 18 pages (with Abstract and Partial Translation).

* cited by examiner

DISTRIBUTED SERVICE SCHEDULING METHOD AND RELATED APPARATUS

CROSS REFERENCE TO RELATED APPLICATIONS

This application is a national stage of International Application No. PCT/CN2021/076812, filed on Feb. 19, 2021, which claims priority to Chinese Patent Application No. 202010132849.X, filed on Feb. 29, 2020. Both of the aforementioned applications are hereby incorporated by reference in their entireties.

TECHNICAL FIELD

This application relates to the field of terminal technologies, and in particular, to a distributed service scheduling method and a related apparatus.

BACKGROUND

Currently, a multi-device interconnection scenario is increasingly enhanced in life, and a requirement for cross-device access and invoking is increasingly urgent. A terminal device usually has a large quantity of system services, to implement many functions.

Currently, there are more and more multi-terminal interconnection scenarios of IoT devices. Data access between the IoT devices is mostly cloud-based. Currently, interconnection between the terminal devices usually relies on a cloud server for uniform scheduling. When connected to a network, an electronic device first uploads data to the cloud, and then the data is integrated by the cloud. When accessing the data, the electronic device requests the data from the cloud. In this manner, the electronic device needs to perform data forwarding by using the cloud, which has high overheads. There is usually an interval for updating data, which does not have high real-time performance.

SUMMARY

This application provides a distributed service scheduling method and a related apparatus, to implement automatic synchronization of a distributed service list between terminal devices, and precise cross-device access to a system service in a decentralized manner without forwarding by a server. Therefore, flexibility and high real-time performance of service collaboration between a plurality of terminal devices are implemented.

According to a first aspect, this application provides a distributed service scheduling method, including: First, a first terminal obtains an invocation request for a first service. Then, the first terminal determines whether the first terminal locally supports the first service. If the first terminal does not locally support the first service, the first terminal determines whether a local database includes service information of the first service. If the first terminal locally supports the first service, the first terminal determines, from the local database, identifier information of the first service and a second terminal that supports the first service. The local database includes service information of one or more distributed services. The service information includes identifier information of the distributed service and a device identifier of a terminal on which the distributed service is located. Then, the first terminal sends the identifier information and the invocation request that are of the first service to the second terminal. The identifier information of the first service is used by the second terminal to match the first service. Then, the first terminal receives a result of executing the first service by the second terminal based on the invocation request.

This application provides a distributed service scheduling method, to implement automatic synchronization of a distributed service list between terminal devices, and precise cross-device access to a system service. In addition, a developer does not need to pay attention to a service, so that system service invoking and resource sharing can be implemented for a plurality of terminal devices, to achieve capability complementation between terminal devices. For example, when a mobile phone and a television are on a same distributed network, the mobile phone may be used to seamlessly switch a video watched on the mobile phone to the television with one touch, and the television continues to provide a video playback service, so that a user can enjoy large-screen experience. For another example, when the mobile phone is interconnected to a head unit, the mobile phone may directly access a service provided by the head unit to play a song. In this way, after getting on a vehicle, a user can enjoy a better sound effect of the vehicle. According to the distributed service scheduling method provided in this application, development efficiency of an application developer is improved, and space for storing the system service by the terminal device is reduced. In addition, a service is scheduled between terminals without forwarding by a server, server centralization is removed, and privacy is also protected.

In a possible implementation, when the first terminal locally supports the first service, the first terminal locally executes the first service based on the invocation request.

In a possible implementation, before the first terminal obtains the invocation request for the first service, the first terminal determines, from one or more system services on the first terminal, the distributed service supported by the first terminal, and stores, in the local database, the service information of the distributed service supported by the first terminal. The distributed service is the system service having a distributed identifier. In this way, the first terminal may select a system service that can be scheduled by another device.

In a possible implementation, before the first terminal obtains the invocation request for the first service, the first terminal sends the service information of the distributed service supported by the first terminal to the second terminal. In this way, the another device may also invoke the distributed service on the first terminal.

In a possible implementation, before the first terminal obtains the invocation request for the first service, the first terminal receives the service information that is sent by the second terminal and that is of the distributed service supported by the second terminal. The first terminal stores, in the local database, the service information of the distributed service supported by the second terminal. In this way, the first terminal stores the service information of the distributed service supported by the another device, to provide a condition for remote scheduling of the first terminal.

In a possible implementation, the first terminal determines, from the local database, a plurality of terminals that support the first service. The first terminal determines the second terminal from the plurality of terminals. The first terminal determines, from the local database, the identifier information of the first service supported by the second terminal. In this way, when the first service exists on a plurality of other terminals, the first terminal may invoke the first service on an optimal terminal based on a decision, to ensure scheduling quality of the first service.

The first terminal determines, from the plurality of terminals based on a historical record, the second terminal in which the first service is invoked for a largest quantity of times within a preset time period.

Alternatively, the service information further includes quality of service of the distributed service. The first terminal determines, from the plurality of terminals based on the quality of service of the distributed service, the second terminal with highest quality of service of the first service.

In a possible implementation, the first terminal outputs an invocation prompt. The invocation prompt is used to prompt a user to select the second terminal from the plurality of terminals. The first terminal receives a selection operation performed by the user on the second terminal. The first terminal determines the second terminal in response to the selection operation. In this way, the user can select a terminal that needs to be invoked, so that user interaction is enhanced.

In a possible implementation, when the first service does not exist locally on the first terminal, the first terminal does not locally support the first service. Alternatively, when the first service exists locally on the first terminal and the first service is occupied, the first terminal does not locally support the first service.

In a possible implementation, when the first terminal detects that the second terminal is offline, the first terminal deletes, from the local database, the service information of the distributed service supported by the second terminal. In this way, a success rate of invoking the distributed service on the another device by the first terminal can be improved.

In a possible implementation, the identifier information includes a service name and/or a pointer address of the distributed service.

According to a second aspect, this application provides another distributed service scheduling method, including: A first terminal obtains an invocation request for a first service. The first terminal determines whether the first terminal locally supports the first service. If the first terminal does not locally support the first service, the first terminal determines whether a first database includes service information of the first service. If the first terminal locally supports the first service, the first terminal determines, from the first database, identifier information of the first service and a second terminal that supports the first service. The first database includes service information of one or more distributed services. The service information includes identifier information of the distributed service and a device identifier of a terminal on which the distributed service is located. The first terminal sends the identifier information and the invocation request that are of the first service to the second terminal. The second terminal obtains the first service through matching based on the identifier information of the first service, and executes the first service based on the invocation request. The second terminal sends a result of executing the first service to the first terminal.

This application provides a distributed service scheduling method, to implement automatic synchronization of a distributed service list between terminal devices, and precise cross-device access to a system service. In addition, a developer does not need to pay attention to a service, so that system service invoking and resource sharing can be implemented for a plurality of terminal devices, to achieve capability complementation between terminal devices. For example, when a mobile phone and a television are on a same distributed network, the mobile phone may be used to seamlessly switch a video watched on the mobile phone to the television with one touch, and the television continues to provide a video playback service, so that a user can enjoy large-screen experience. For another example, when the mobile phone is interconnected to a head unit, the mobile phone may directly access a service provided by the head unit to play a song. In this way, after getting on a vehicle, a user can enjoy a better sound effect of the vehicle. According to the distributed service scheduling method provided in this application, development efficiency of an application developer is improved, and space for storing the system service by the terminal device is reduced. In addition, a service is scheduled between terminals without forwarding by a server, server centralization is removed, and privacy is also protected.

In a possible implementation, when the first terminal locally supports the first service, the first terminal locally executes the first service based on the invocation request.

In a possible implementation, before the first terminal obtains the invocation request for the first service, the first terminal determines, from one or more system services on the first terminal, the distributed service supported by the first terminal, and stores, in the local database, the service information of the distributed service supported by the first terminal. The distributed service is the system service having a distributed identifier. In this way, the first terminal may select a system service that can be scheduled by another device.

In a possible implementation, before the first terminal obtains the invocation request for the first service, the first terminal sends the service information of the distributed service supported by the first terminal to the second terminal. The second terminal stores, in a second database, the service information of the distributed service supported by the first terminal. In this way, the another device may also invoke the distributed service on the first terminal.

In a possible implementation, before the first terminal obtains the invocation request for the first service, the second terminal stores, in the second database, the service information of the distributed service supported by the second terminal. The second terminal sends the service information of the distributed service supported by the second terminal to the first terminal. The first terminal stores, in the first database, the service information of the distributed service supported by the second terminal. In this way, the first terminal stores the service information of the distributed service supported by the another device, to provide a condition for remote scheduling of the first terminal.

In a possible implementation, the first terminal determines, from the first database, a plurality of terminals that support the first service. The first terminal determines the second terminal from the plurality of terminals. The first terminal determines, from the first database, the identifier information of the first service supported by the second terminal. In this way, when the first service exists on a plurality of other terminals, the first terminal may invoke the first service on an optimal terminal based on a decision, to ensure scheduling quality of the first service.

The first terminal determines, from the plurality of terminals based on a historical record, the second terminal in which the first service is invoked for a largest quantity of times within a preset time period.

Alternatively, the service information further includes quality of service of the distributed service. The first terminal determines, from the plurality of terminals based on the quality of service of the distributed service, the second terminal with highest quality of service of the first service.

In a possible implementation, the first terminal outputs an invocation prompt. The invocation prompt is used to prompt a user to select the second terminal from the plurality of terminals. The first terminal receives a selection operation performed by the user on the second terminal. The first terminal determines the second terminal in response to the selection operation. In this way, the user can select a terminal that needs to be invoked, so that user interaction is enhanced.

In a possible implementation, when the first service does not exist locally on the first terminal, the first terminal does not locally support the first service. Alternatively, when the first service exists locally on the first terminal and the first service is occupied, the first terminal does not locally support the first service.

In a possible implementation, when the first terminal detects that the second terminal is offline, the first terminal deletes, from the local database, the service information of the distributed service supported by the second terminal. In this way, a success rate of invoking the distributed service on the another device by the first terminal can be improved.

In a possible implementation, the identifier information includes a service name and/or an address pointer of the distributed service.

According to a third aspect, this application provides a terminal. The terminal is a first terminal and includes an application program, a service management module, and a communication module. The application program is configured to initiate an invocation request for a first service to the service management module. The service management module is configured to: determine whether the first terminal locally supports the first service, and if the first terminal does not locally support the first service, determine whether a local database includes service information of the first service, or if the first terminal locally supports the first service, determine, from the local database, identifier information of the first service and a second terminal that supports the first service. The local database includes service information of one or more distributed services. The service information includes identifier information of the distributed service and a device identifier of the terminal on which the distributed service is located. The communication module is configured to send the identifier information and the invocation request that are of the first service to the second terminal. The identifier information of the first service is used by the second terminal to match the first service. The communication module is further configured to: receive a result of executing the first service by the second terminal based on the invocation request, and return the result to the application program.

This application provides a terminal, to implement automatic synchronization of a distributed service list between terminal devices, and precise cross-device access to a system service. In addition, a developer does not need to pay attention to a service, so that system service invoking and resource sharing can be implemented for a plurality of terminal devices, to achieve capability complementation between terminal devices. For example, when a mobile phone and a television are on a same distributed network, the mobile phone may be used to seamlessly switch a video watched on the mobile phone to the television with one touch, and the television continues to provide a video playback service, so that a user can enjoy large-screen experience. For another example, when the mobile phone is interconnected to a head unit, the mobile phone may directly access a service provided by the head unit to play a song. In this way, after getting on a vehicle, a user can enjoy a better sound effect of the vehicle. According to the distributed service scheduling method provided in this application, development efficiency of an application developer is improved, and space for storing the system service by the terminal device is reduced. In addition, a service is scheduled between terminals without forwarding by a server, server centralization is removed, and privacy is also protected.

In a possible implementation, the service management module is further configured to locally execute the first service when the first terminal locally supports the first service.

In a possible implementation, the service management module is further configured to: before the application program initiates the invocation request for the first service to the service management module, determine, from one or more system services on the first terminal, the distributed service supported by the first terminal, and store, in the local database, the service information of the distributed service supported by the first terminal. The distributed service is the system service having a distributed identifier. In this way, the first terminal may select a system service that can be scheduled by another device.

In a possible implementation, the communication module is further configured to: before the application program initiates the invocation request for the first service to the service management module, send the service information of the distributed service supported by the first terminal to the second terminal. In this way, the another device may also invoke the distributed service on the first terminal.

In a possible implementation, the communication module is further configured to: before the application program initiates the invocation request for the first service to the service management module, receive the service information that is sent by the second terminal and that is of the distributed service supported by the second terminal. The service management module is further configured to store, in the local database, the service information of the distributed service supported by the second terminal. In this way, the first terminal stores the service information of the distributed service supported by the another device, to provide a condition for remote scheduling of the first terminal.

In a possible implementation, the service management module is specifically configured to: determine, from the local database, a plurality of devices that support the first service; determine the second terminal from the plurality of devices; and determine, from the local database, the identifier information of the first service supported by the second terminal. In this way, when the first service exists on a plurality of other terminals, the first terminal may invoke the first service on an optimal terminal based on a decision, to ensure scheduling quality of the first service.

The service management module is specifically configured to determine, from the plurality of devices based on a historical record, the second terminal in which the first service is invoked for a largest quantity of times within a preset time period.

Alternatively, the service information further includes quality of service of the distributed service. The service management module is specifically configured to determine, from the plurality of devices based on the quality of service of the distributed service, the second terminal with highest quality of service of the first service.

In a possible implementation, the terminal further includes an input module and an output module. The output module is configured to output an invocation prompt after the service management module determines, from the database, the plurality of devices that support the first service. The invocation prompt is used to prompt a user to select the second terminal from the plurality of devices. The input module is configured to receive a selection operation performed by the user on the second terminal. The service management module is specifically configured to determine the second terminal in response to the selection operation. In this way, the user can select a terminal that needs to be invoked, so that user interaction is enhanced.

In a possible implementation, the service management module is specifically configured to: when the first service does not exist locally on the first terminal, determine that the first terminal does not locally support the first service; or when the first service exists locally on the first terminal and the first service is occupied, determine that the first terminal does not locally support the first service.

In a possible implementation, the service management module is further configured to: when detecting that the second terminal is offline, delete, from the local database, the service information of the distributed service supported by the second terminal. In this way, a success rate of invoking the distributed service on the another device by the first terminal can be improved.

In a possible implementation, the identifier information includes a service name and/or a pointer address of the distributed service.

According to a fourth aspect, this application provides a terminal. The terminal is a first terminal and includes one or more processors, one or more memories, and a communication interface. The one or more memories and the communication interface are coupled to the one or more processors. The one or more memories are configured to store computer program code. The computer program code includes computer instructions. When the one or more processors execute the computer instructions, the first terminal is enabled to perform the distributed service scheduling method according to any possible implementation of any one of the foregoing aspects.

According to a fifth aspect, an embodiment of this application provides a computer storage medium, including computer instructions. When the computer instructions are run on a terminal, a communication apparatus is enabled to perform the distributed service scheduling method according to any possible implementation of any one of the foregoing aspects.

According to a sixth aspect, an embodiment of this application provides a computer program product. When the computer program product runs on a computer, the computer is enabled to perform the distributed service scheduling method according to any possible implementation of any one of the foregoing aspects.

DETAILED DESCRIPTION OF ILLUSTRATIVE EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes a solution of service scheduling between terminal devices in the conventional technology.

Figure 1:
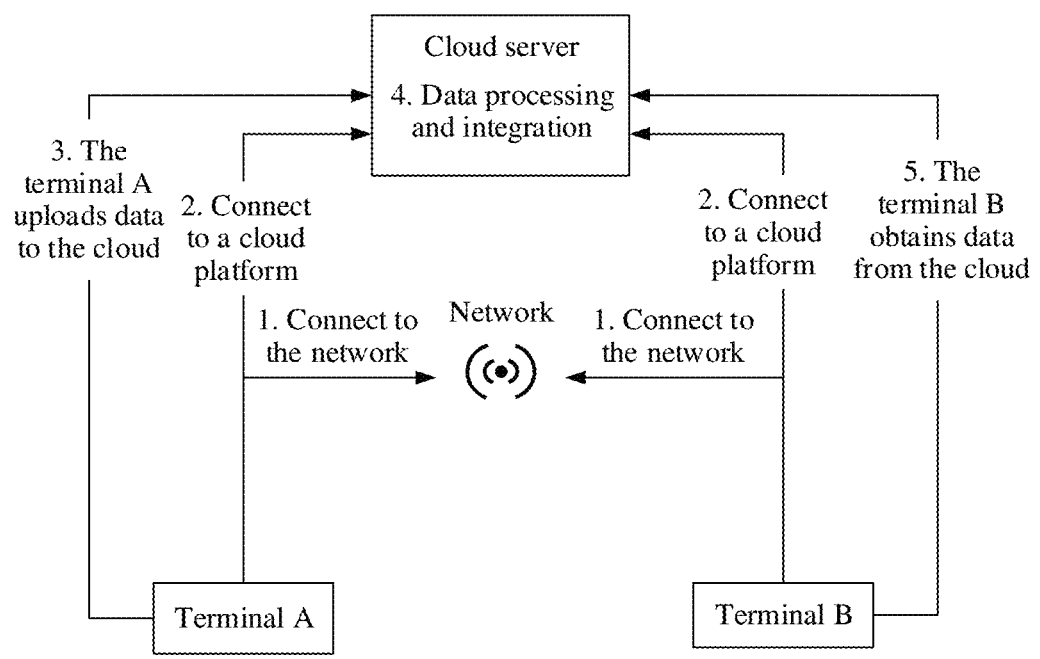
FIG. 1 is a schematic flowchart of a service scheduling method in a related technology according to an embodiment of this application.

Currently, interconnection between the terminal devices usually relies on a cloud server for uniform scheduling. Actually, Internet communication is performed between the terminal devices. FIG. 1 is a flowchart of a service scheduling solution in the conventional technology according to this application.

As shown in FIG. 1, the solution may include the following steps.

1. A terminal A and a terminal B are connected to a network (Internet).

2. The terminal A and the terminal B are connected to a cloud server by using the connected network.

3. The terminal A can upload data to the cloud server.

4. After receiving the data uploaded by the terminal A, the cloud server may process and integrate the data.

5. When the terminal B needs to invoke the data or a service on the terminal A, the terminal B may obtain, from the cloud server, the data that needs to be obtained.

It can be learned from the foregoing steps that, in the conventional technology, if the terminal B needs to invoke the service or the data on the terminal A, the terminal B needs to perform data forwarding by using the cloud server, and processing of the cloud server has high overheads and is time-consuming. In addition, there is usually an interval for the terminal A to update the data to the cloud server, which does not have high real-time performance and cannot satisfy a terminal that frequently interacts with a user.

Figure 2:
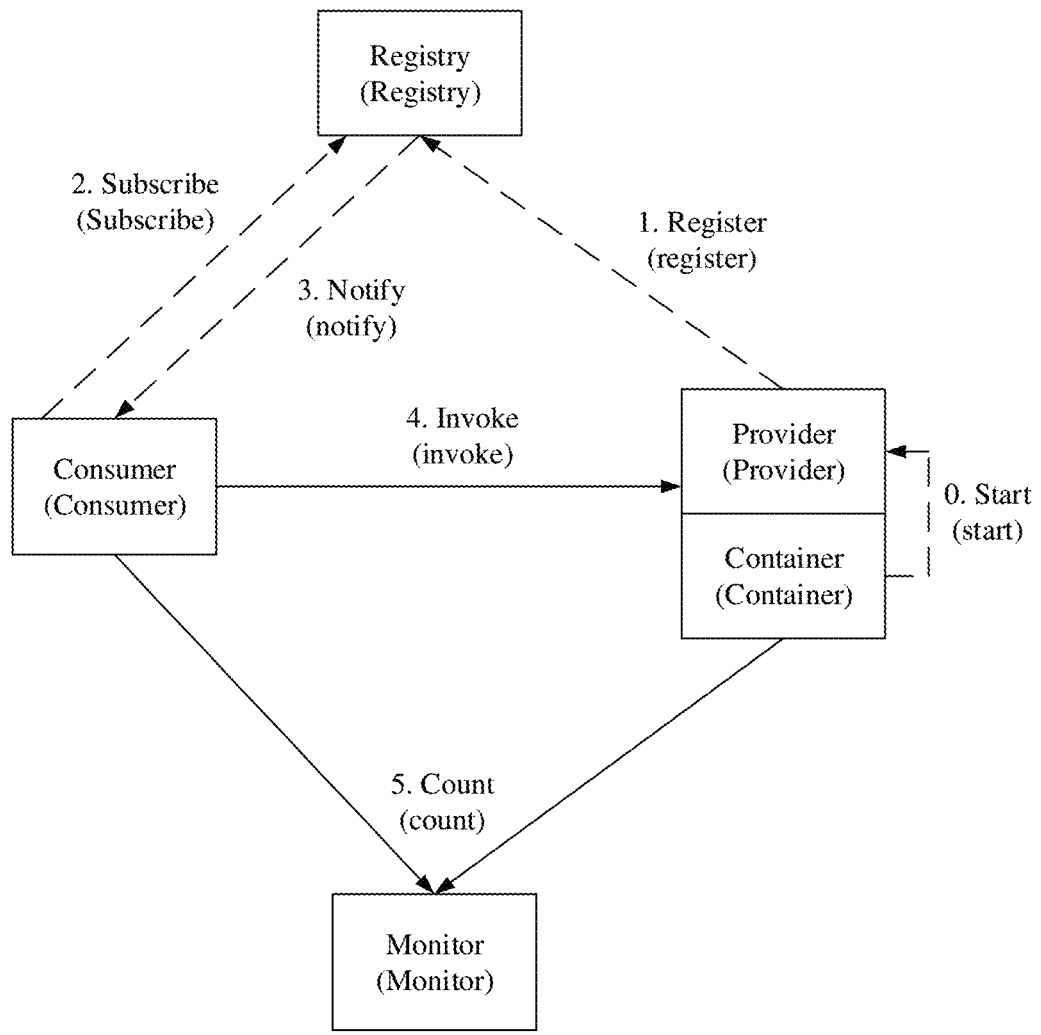
FIG. 2 is a schematic flowchart of a service scheduling method in another related technology according to an embodiment of this application.

Currently, a distributed service network framework is provided in the conventional technology, and is applied to the field of a distributed cluster. FIG. 2 is a framework diagram of a distributed service network system in the conventional technology.

As shown in FIG. 2, the distributed service network system includes a registry (registry), a consumer (consumer), a container (container), a provider (provider), and a monitor (monitor).

1. Initialization phase: After being started, the provider (provider) deployed in the container (container) can publish a service of the provider (provider) to the registry (registry) and register the service with the registry (registry). During initialization, the consumer (consumer) subscribes to a desired service from the registry (registry), and the registry (registry) maintains a persistent connection to the consumer. When a node is added to or deleted from the subscribed service, the update is notified to the consumer (consumer) in time. Therefore, the consumer (consumer) obtains all real-time information of the provider (provider), and the consumer (consumer) can initiate service invoking to the provider (provider).

2. Invoke (invoke) phase: The consumer (consumer) can select a most suitable provider (provider) for invoking from all provider (provider) lists obtained from the registry (registry) based on a policy such as load balancing, and initiate synchronous invoking.

3. Monitor (monitor) phase: The consumer and the provider report data that needs to be monitored to the monitor (monitor) in an asynchronous manner.

It can be learned from the foregoing steps that, all existing distributed service management frameworks serve the field of the distributed cluster, and a service registry (a super node) is needed for specifically maintaining service information, for example, the registry (registry) shown in FIG. 2. The registry is an important composition module in a distributed service system, and manages the provider (provider) of all services. In an actual running environment, the service registry (registry) is passively notified or the consumer (consumer) actively queries that, when a node breaks down or a new node is added in the provider (provider), the consumer (consumer) can also sense the breakdown or the adding in real time, to prevent a specific provider (provider) from being invoked infinitely or being idle infinitely. In this way, when invoking the service on the provider, the consumer needs to establish a connection to the registry, which is not flexible enough when the consumer is applied to a distributed terminal.

Therefore, this application provides a distributed service scheduling method, to implement automatic synchronization of a distributed service list between terminal devices, and precise cross-device access to a system service. In addition, a developer does not need to pay attention to a service, so that system service invoking and resource sharing can be implemented for a plurality of terminal devices, to achieve capability complementation between terminal devices. For example, when a mobile phone and a television are on a same distributed network, the mobile phone may be used to seamlessly switch a video watched on the mobile phone to the television with one touch, and the television continues to provide a video playback service, so that a user can enjoy large-screen experience. For another example, when the mobile phone is interconnected to a head unit, the mobile phone may directly access a service provided by the head unit to play a song. In this way, after getting on a vehicle, a user can enjoy a better sound effect of the vehicle. According to the distributed service scheduling method provided in this application, development efficiency of an application developer is improved, and space for storing the system service by the terminal device is reduced.

The following describes a terminal in embodiments of this application.

Figure 3:
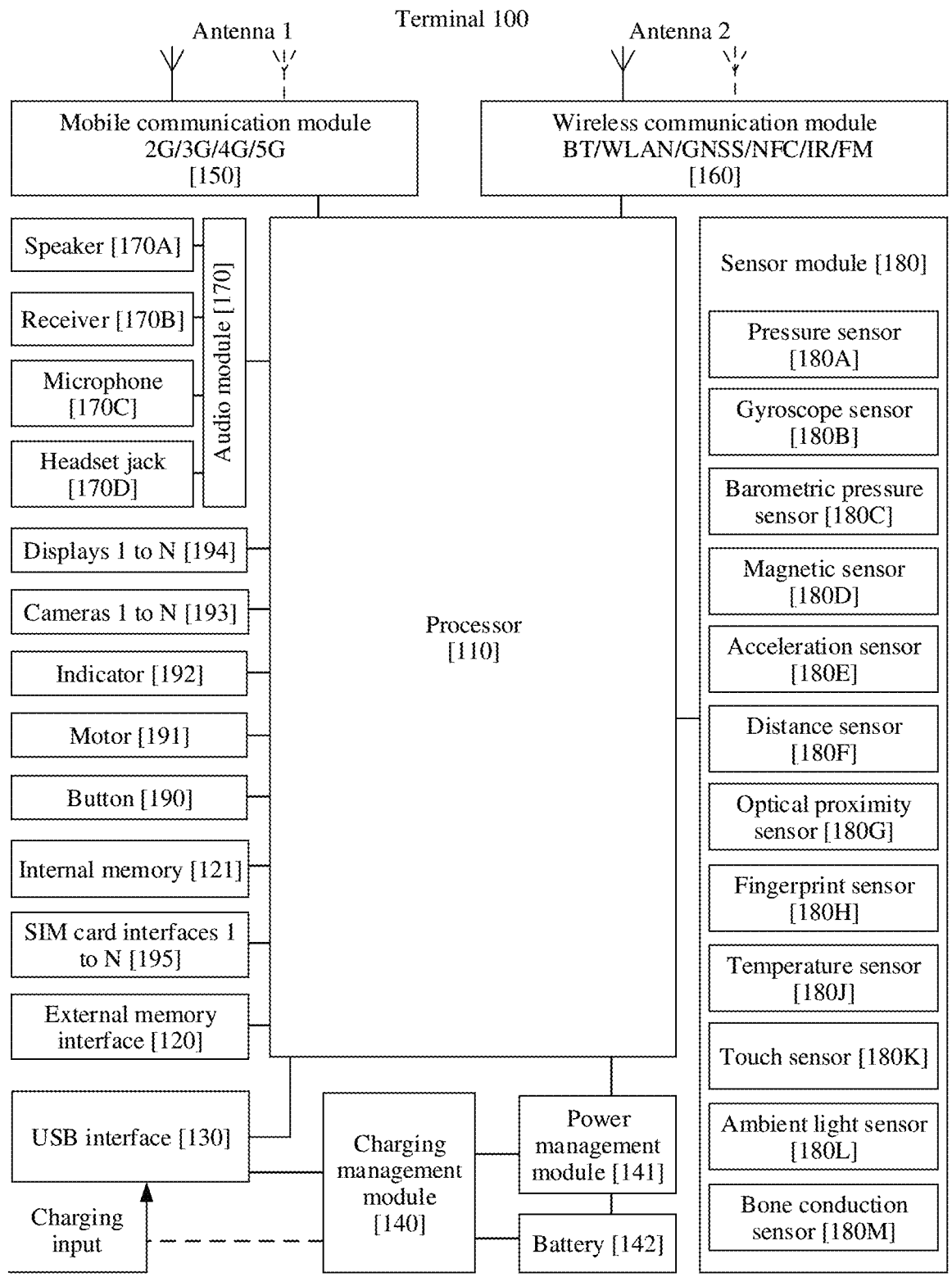
FIG. 3 is a schematic diagram of a hardware structure of a terminal according to an embodiment of this application.

FIG. 3 is a schematic diagram of a structure of a terminal 100.

The terminal 100 is used as an example below to describe embodiments in detail. It should be understood that the terminal 100 shown in FIG. 3 is merely an example, and the terminal 100 may have more or fewer components than those shown in FIG. 3, may combine two or more components, or may have different component configurations. Components shown in the figure may be implemented by hardware, software, or a combination of hardware and software that includes one or more signal processing and/or application-specific integrated circuits.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor no may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor no may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like.

In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the terminal 100, and may also be configured to transmit data between the terminal 100 and a peripheral device, or may be configured to connect to a headset for playing audio through the headset. The interface may be further configured to connect to another terminal such as an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the foregoing embodiment, or may use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the terminal 100. The charging management module 140 may further supply power to the terminal by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 can provide a solution to wireless communication that is applied to the terminal 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that is applied to the terminal 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the terminal 100 may include one or N displays 194, where N is a positive integer greater than 1.

The terminal 100 may implement an image shooting function by using the ISP, the camera 193, the video codec, the GPU, the display 194, the application processor, and the like.

The ISP is configured to process data fed back by the camera 193. For example, during image shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transform and the like on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the terminal 100, such as image recognition, facial recognition, speech recognition, and text understanding.

The external memory interface 120 may be configured to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a sound playing function or an image playing function), and the like. The data storage area may store data (for example, audio data and a phone book) and the like created when the terminal 100 is used. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The terminal 100 may listen to music or answer a call in a hands-free mode by using the speaker 170A.

The receiver 170B, also referred to as an "earpiece", is configured to convert an electrical audio signal into a sound signal. When a call is answered or audio information is listened to by using the terminal 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure strength based on a capacitance change. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messages icon, an instruction for viewing a message is executed. When a touch operation whose touch operation intensity is greater than or equal to the first pressure threshold is performed on the Messages icon, an instruction for creating a message is executed.

The gyroscope sensor 180B may be configured to determine a motion posture of the terminal 100. In some embodiments, angular velocities of the terminal 100 around three axes (namely, x, y, and z axes) may be determined by using the gyroscope sensor 180B. The gyroscope sensor 180B may be configured to implement image stabilization during image shooting. For example, when the shutter is opened, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal 100 calculates an altitude by using a barometric pressure value measured by the barometric pressure sensor 180C, to assist positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations of the terminal 100 in various directions (usually on three axes). When the terminal 100 is still, a value and a direction of gravity may be detected. The acceleration sensor 180E may be further configured to recognize a posture of a terminal, and is applied in an application such as a pedometer or screen switching between a landscape mode and a portrait mode.

The distance sensor 180F is configured to measure a distance. The terminal 100 may measure a distance through infrared light or a laser. In some embodiments, the terminal 100 may use the distance sensor 180F to measure a distance, to implement fast focusing in an image shooting scenario.

The optical proximity sensor 180G may include, for example, a light emitting diode (LED) and an optical detector, for example, a photodiode. The light emitting diode may be an infrared light emitting diode. The terminal 100 emits infrared light by using the light emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during image shooting. The ambient light sensor 180L may also cooperate with the optical proximity sensor 180G to detect whether the terminal 100 is in a pocket to prevent a false touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using a temperature detected by the temperature sensor 180J. For example, when the temperature reported by the temperature sensor 180J exceeds a threshold, the terminal 100 lowers performance of a processor located near the temperature sensor 180J, to reduce power consumption to implement thermal protection. In some other embodiments, when the temperature is lower than another threshold, the terminal 100 heats the battery 142 to prevent the terminal 100 from being shut down abnormally because of a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the terminal 100 in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

The following describes a software system architecture of a terminal provided in an embodiment of this application.

A software system of the terminal 100 may use a layered architecture, an event-driven architecture, a microkernel architecture, a microservice architecture, or a cloud architecture. In this embodiment of the present invention, the layered architecture is used as an example to illustrate a software structure of the terminal 100.

Figure 4A:
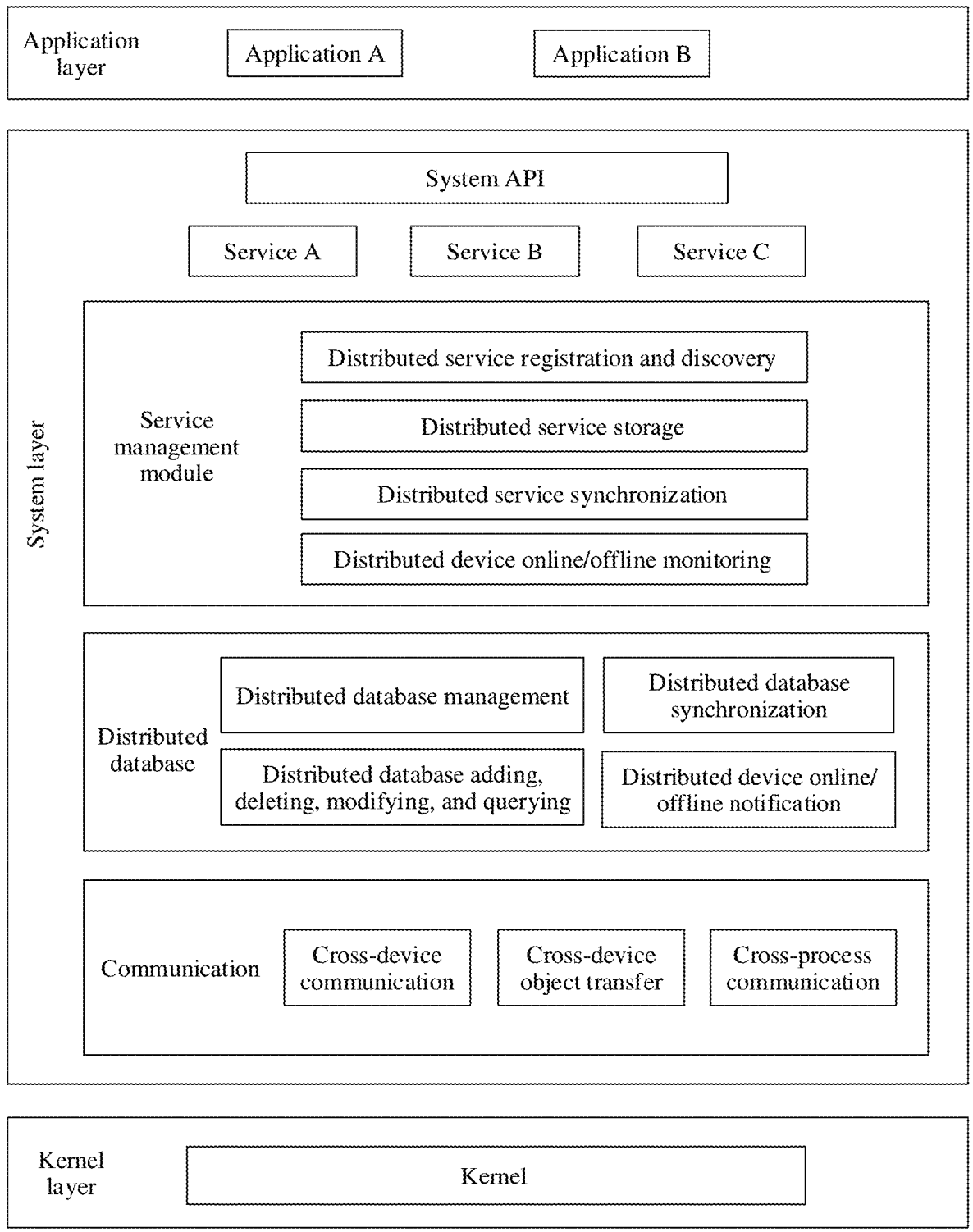
FIG. 4A is a schematic diagram of a software system architecture of a terminal according to an embodiment of this application.

FIG. 4A is a block diagram of a software architecture of the terminal 100 according to an embodiment of this application. In a layered architecture, software is divided into several layers, and each layer has a clear role and task. The layers communicate with each other through a software interface. In some embodiments, a system of the terminal may be divided into an application layer, a system layer, and a kernel layer.

The application layer may be configured to implement management and an interface operation on a peripheral device. The application layer may include a series of application packages, for example, applications such as Camera, Gallery, Calendar, Phone, Maps, Navigation, WLAN, Bluetooth, Music, Videos, Messages, Email, Browser, and Contacts.

The system layer may be configured to be responsible for connecting an operating system and the application layer, to provide a basic function of the system. The system layer may include a distributed service management module, a database, a communication module, and a system layer application programming interface.

The distributed service management module may be configured to provide a service registration and discovery capability, to discover and register a service on the terminal. The distributed service management module may be further configured to store service information of the service in the database. The service information includes a service identifier, an identifier of the terminal on which the service is located, and a pointer address of a service instance. The pointer address of the service instance may be used to indicate a storage location of the service instance on the terminal. The distributed service management module may be further configured to synchronize the service information between a plurality of terminals. The distributed service management module may be further configured to monitor going online and offline of another device, and trigger synchronization of the service information.

The database may provide a capability of managing a distributed database, a capability of synchronizing the distributed database between the terminals, a capability of accessing distributed data (adding, deleting, modifying, and querying), and a capability of notifying going online and offline of the terminal.

The communication module may be configured to provide a cross-device communication capability, a cross-process communication capability, and a cross-device object transfer capability.

The kernel layer is an internal core program of the operating system, and may be configured to externally provide core management invoking of the terminal device. Code of the operating system may be divided into a plurality of parts. Address space in which a kernel is located may be referred to as kernel space.

The following describes, with reference to the foregoing terminal software architecture, an architectural diagram of a distributed system provided in this application.

Figure 4B:
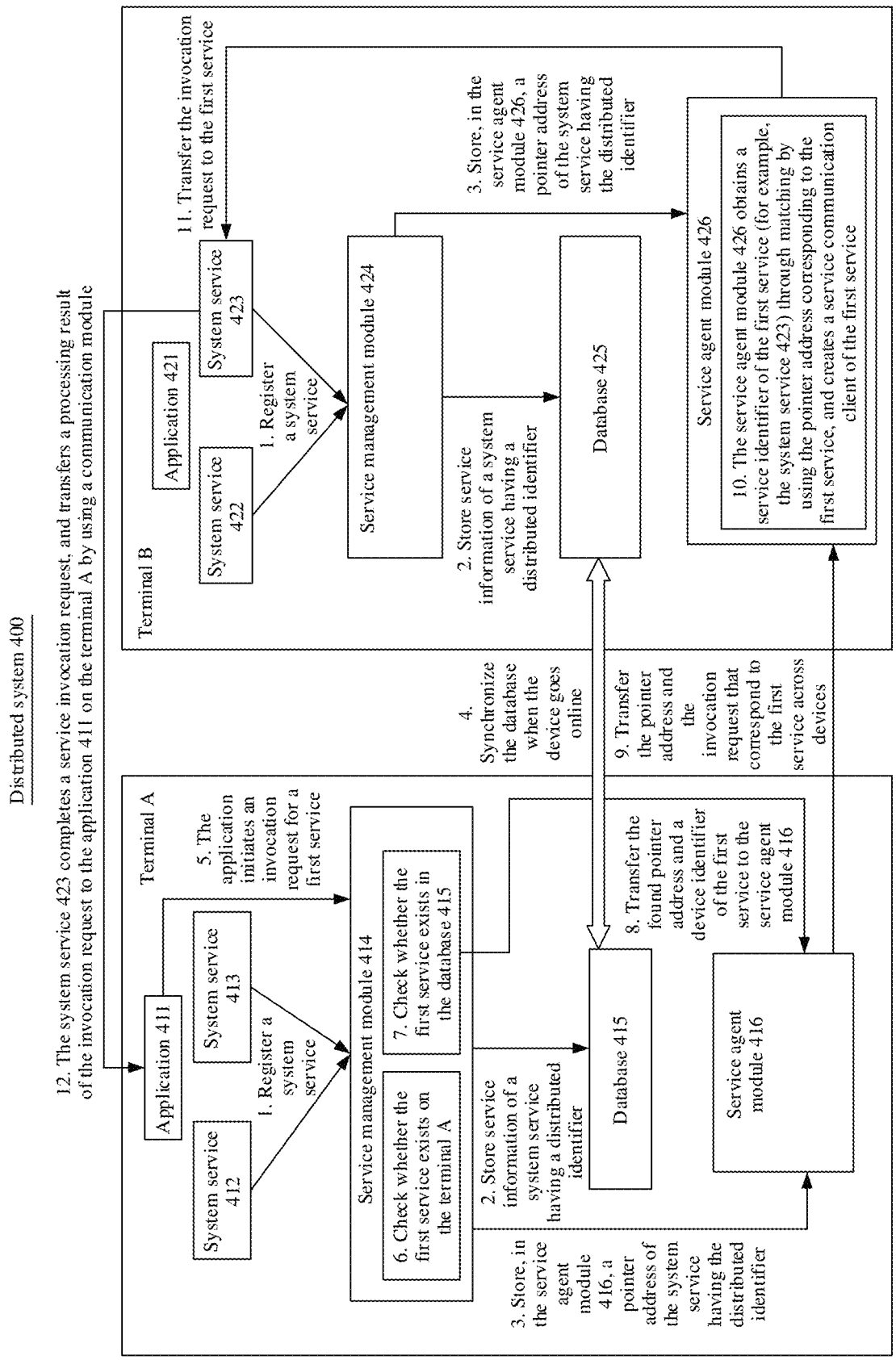
FIG. 4B is a schematic diagram of an architecture of a distributed system according to an embodiment of this application.

FIG. 4B is an architectural diagram of a distributed system 400 according to an embodiment of this application. The distributed system 400 may include a plurality of terminals. The plurality of terminals may be connected to a same network. For example, the plurality of terminals may be connected to a same local area network. In a possible implementation, a same system account may be logged in to the plurality of terminals. For example, all the system accounts logged in to the plurality of terminals may be "HW9527". In a possible implementation, the system accounts logged in to the plurality of terminals may all belong to a same account group. For example, the system accounts logged in to the plurality of terminals include "HW001", "HW002", and "HW003". The system accounts "HW001", "HW002", and "HW003" belong to the account group "HUAWEI Home". In a possible implementation, the plurality of terminals may establish a temporary account group by using near field communication (Near Field Communication, NFC), and the plurality of terminals may establish a temporary account group by scanning a same QR code.

For example, the terminal in this embodiment of this application may be a mobile phone, a television, a tablet computer, a sound box, a watch, a desktop computer, a laptop computer, a handheld computer, a notebook computer, an ultra-mobile personal computer (ultra-mobile personal computer, UMPC), a netbook, a personal digital assistant (personal digital assistant, PDA), an augmented reality (Augmented reality, AR)\virtual reality (virtual reality, VR) device, or the like. A specific type of the terminal is not specially limited in this embodiment of this application.

As shown in FIG. 4B, an example in which the distributed system 400 includes two terminals is used for description in this embodiment of this application. For example, the distributed system 400 includes a terminal A and a terminal B. The terminal A may be referred to as a first terminal, and the terminal B may be referred to as a second terminal.

The terminal A may include one or more applications (for example, an application 411), one or more system services (for example, a system service 412 and a system service 413), a service management module 414, a database 415, and a communication service agent module 416. The terminal B may include one or more applications (for example, an application 421), one or more system services (for example, a system service 422 and a system service 423), a service management module 424, a database 425, and a service agent module 426.

With reference to the architecture diagram of the foregoing distributed system, the following describes a distributed service scheduling method provided in an embodiment of this application.

As shown in FIG. 4B, a procedure of the distributed service scheduling method may be as follows:

1. The terminal in the distributed system may register a system service of the terminal with a service management module.

For example, the system service registered on the terminal A may include the system service 412 and the system service 413. The system service registered on the terminal B may include the system service 422 and the system service 423.

2. After receiving a request for registering the system service, the service management module on the terminal in the distributed system may determine whether the system service has a distributed identifier. If the system service has a distributed identifier, the service management module may determine the system service having the distributed identifier as a distributed service, and store service information of the distributed service in the database. The distributed identifier may be used to indicate that the system service can be invoked by another device.

The service information of the distributed service may include identifier information of the distributed service and a device identifier of a device on which the distributed service is located. The identifier information of the distributed service may include a service name and/or a pointer address of the distributed service. The pointer address of the distributed service is used to indicate a storage address that is on the terminal and that is of a service instance (that is, a resource for implementing the distributed service) of the distributed service.

For example, after receiving a registration request initiated by the system service 412, the service management module 414 in the terminal A may determine whether the system service 412 has the distributed identifier. If the system service 412 has the distributed identifier, the service management module 414 may determine the system service 412 as the distributed service, and store the service information of the system service 412 in the database 415. After receiving the registration request initiated by the system service 413, the service management module 414 in the terminal A may determine whether the system service 413 has the distributed identifier. If the system service 413 has the distributed identifier, the service management module 414 may determine the system service 413 as the distributed service, and store the service information of the system service 413 in the database 415.

For another example, after receiving the registration request initiated by the system service 422, the service management module 424 in the terminal B may determine whether the system service 422 has the distributed identifier. If the system service 422 has the distributed identifier, the service management module 414 may store the service information of the system service 422 in the database 425. After receiving the registration request initiated by the system service 423, the service management module 424 in the terminal B may determine whether the system service 423 has the distributed identifier. If the system service 423 has the distributed identifier, the service management module 424 may store the service information of the system service 423 in the database 425.

3. The service management module on the terminal in the distributed system may invoke an interface provided by the communication module (not shown in FIG. 4B), and store, in the service agent module, an identifier and the pointer address of the system service having the distributed identifier, to query and match the distributed service. The service agent module may store the service identifier and the pointer address of the distributed service in a key-value (key-value) pair storage mode.

For example, both the system service 412 and the system service 413 on the terminal A may be invoked by another device. Both the system service 412 and the system service 413 have the distributed identifier. The service management module 414 on the terminal A may invoke the interface provided by the communication module on the terminal A, and store the respective service identifiers and pointer addresses of the system service 412 and the system service 413 in the service agent module 416.

For another example, both the system service 422 and the system service 423 on the terminal B may be invoked by another device. Both the system service 422 and the system service 423 have the distributed identifier. The service management module 424 on the terminal B may invoke the interface provided by the communication module on the terminal B, and store the respective service identifiers and pointer addresses of the system service 422 and the system service 423 in the service agent module 426.

4. When the terminal A and the terminal B detect each other going online, the terminal A and the terminal B can synchronize content in respective databases.

For example, after the terminal A stores the service information of the system service 412 and the service information of the system service 413 in the distributed database 415, and the terminal B stores the service information of the system service 422 and the service information of the system service 423 in the distributed database 425, the terminal A and the terminal B detect each other going online. The terminal A may send, to the terminal B by using the communication module, the service information that is of the distributed service of the terminal A and that is in the database 415. The terminal B may store, in the database 425, the service information that is of the distributed service of the terminal A and that is in the database 415. The terminal B may send, to the terminal A by using the communication module, the service information that is of the distributed service of the terminal B and that is in the database 425. The terminal A may store, in the database 415, the service information that is of the distributed service of the terminal B and that is in the database 425.

5. The application 411 on the terminal A may invoke a system application programming interface (api) to send an invocation request for the first service to the service management module 414.

6. After receiving the invocation request sent by the application 411 for the first service, the service management module 414 may query whether the first service exists locally on the terminal A. If the first service exists locally on the terminal A, the service management module 414 may invoke the first service, execute the invocation request, and return a result of executing the invocation request to the application 411.

7. When the first service does not exist locally on the terminal A, the service management module 414 may query whether the service information of the first service is stored in the database 415.

8. If the service information of the first service is stored in the database 415, the service management module 414 may transfer, to the service agent module 416, identifier information and a device identifier that correspond to the first service. The device identifier corresponding to the first service is a device identifier of the terminal B. If the service information of the first service is not stored in the database 415, the service management module 414 may return, to the application 411, a result indicating that invoking of the first service is not supported.

9. The service agent module 416 may transfer, to the service agent module 426 on the terminal B by using the cross-device communication capability provided by the communication module, the identifier information and the invocation request that correspond to the first service.

10. After receiving the identifier information and the invocation request that are of the first service and that are sent by the terminal A, the service agent module 426 on the terminal B may obtain, through matching, a service name of the first service (for example, a service name of the system service 423) based on the identifier information that is of the first service and that is sent by the terminal A, and the identifier information that is of the system service having the distributed identifier and that is stored in the service agent module 426, and then create a service communication client (not shown in the figure) based on the service name of the first service. The service communication client may be configured to send the invocation request to the first service.

11. The service agent module 426 on the terminal B may transfer the invocation request to the first service (for example, the system service 423) by using the service communication client corresponding to the first service.

12. After receiving the invocation request, the first service (for example, the system service 423) may complete the invocation request, and send a processing result of the invocation request to the application 411 on the terminal A by using the cross-device communication capability provided by the communication module.

The following describes a distributed service scheduling method provided in this application.

The distributed service scheduling method provided in an embodiment of this application may be applied to the distributed system in the foregoing embodiment. The distributed system may include a plurality of terminals. The plurality of terminals may be connected to a same network. For example, the plurality of terminals may be connected to a same local area network. In a possible implementation, a same system account may be logged in to the plurality of terminals. For example, all the system accounts logged in to the plurality of terminals may be "HW9527". In a possible implementation, the system accounts logged in to the plurality of terminals may all belong to a same account group. For example, the system accounts logged in to the plurality of terminals include "HW001", "HW002", and "HW003". The system accounts "HW001", "HW002", and "HW003" belong to the account group "HUAWEI Home". In this embodiment of this application, an example in which the distributed system includes two terminals (for example, a terminal A and a terminal B) is used to describe the distributed service scheduling method. The terminal A may be referred to as a first terminal, and the terminal B may be referred to as a second terminal.

Figure 5:
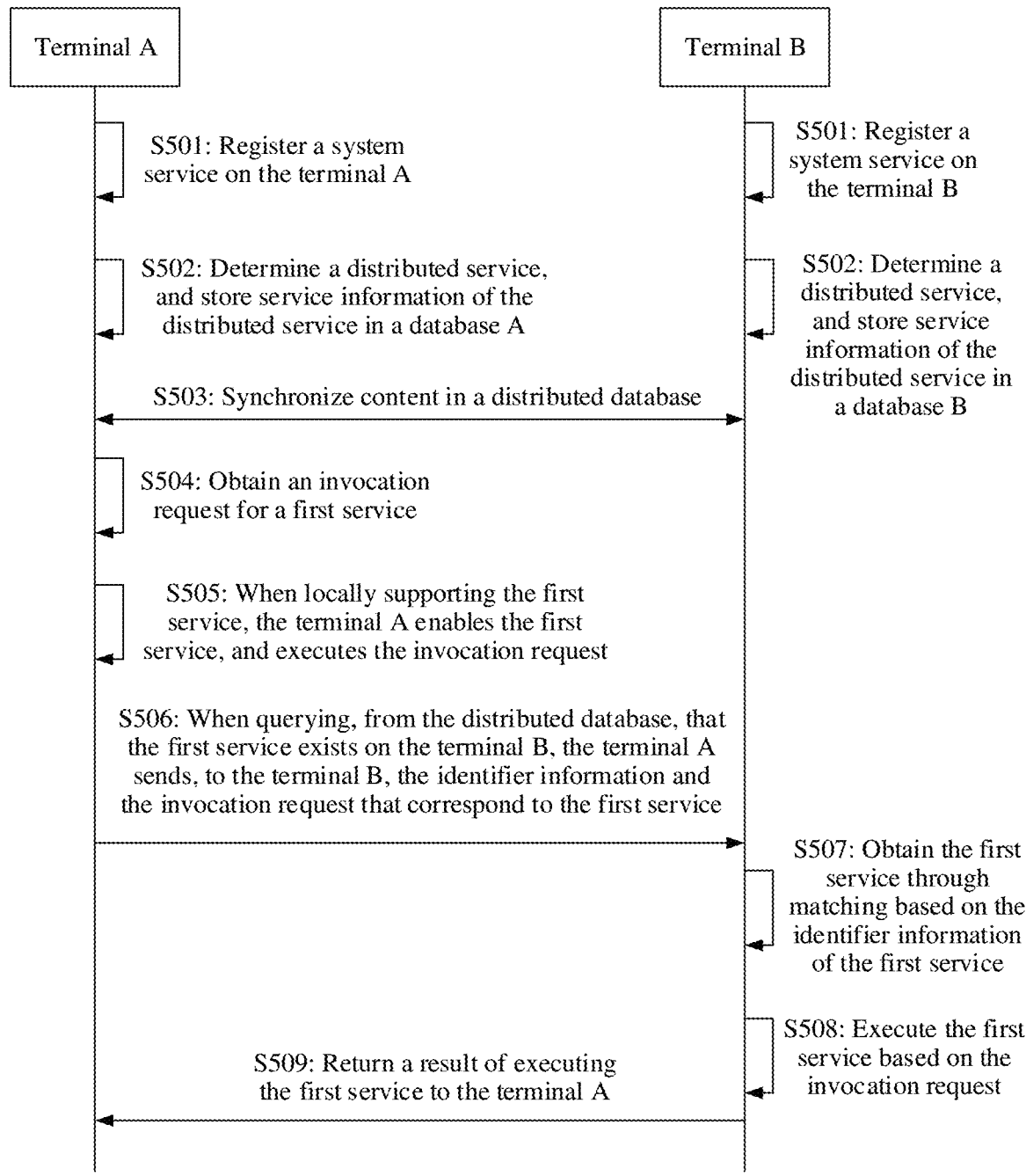
FIG. 5 is a schematic flowchart of a distributed service scheduling method according to an embodiment of this application.

FIG. 5 is a schematic flowchart of a distributed service scheduling method according to an embodiment of this application. As shown in FIG. 5, the method may include the following steps.

S501: The terminal A and the terminal B register respective system services.

For a specific implementation process, refer to the foregoing embodiment shown in FIG. 4B. Details are not described herein again.

S502: The terminal A and the terminal B determine respective distributed services from the respective registered system services, and store service information of the respective distributed services in respective databases. The database on the terminal A may be referred to as a database A, and the database on the terminal B may be referred to as a database B.

The distributed service is a service having a distributed identifier in the system service, and the system service having the distributed identifier may support remote invocation. The terminal may determine whether the system service has the distributed identifier. If the system service has the distributed identifier, the system service is a distributed service.

The service information of a plurality of distributed services may be stored in the database. The service information of the distributed service includes identifier information of the distributed service and a device identifier of the terminal on which the distributed service is located. The identifier information includes a service name and/or a pointer address of the distributed service. The pointer address of the distributed service is used to indicate a storage address that is on the terminal and that is of a service instance (that is, a resource for implementing the distributed service) of the distributed service.

S503: The terminal A and the terminal B synchronize content in respective databases.

After storing, in the database A, the service information of the distributed service on the terminal A, the terminal A may send the service information of the distributed service on the terminal A to the terminal B. The terminal B may store, in the database B, the service information of the distributed service on the terminal A. After storing, in the database B, the service information of the distributed service on the terminal B, the terminal B may send the service information of the distributed service on the terminal B to the terminal A. The terminal A may store, in the database A, the service information of the distributed service on the terminal B.

For example, when the terminal A stores, in the database A, the service information of the distributed service on the terminal A, the database A may be shown in Table 1.

TABLE 1

| Device identifier | Service name of the distributed service | Pointer address of the distributed service |
|---|---|---|
| 0x01 | bluetooth | p_1 |
|  | location | p_2 |
|  | audioflinger | p_3 |
|  | audiopolicy | p_4 |
|  | . . . | . . . |

It can be learned from the foregoing Table 1 that, the device identifier of the terminal A may be "0x01", and the distributed service on the terminal A may include a Bluetooth background management service, a location service, an audio recording and playing service, an audio policy service, and the like. The service name of the Bluetooth background management service may be "bluetooth", and the pointer address of the Bluetooth background management service on the terminal A may be "p_1". The service name of the location service may be "location", and the pointer address of the location service on the terminal A may be "p_2". The service name of the audio recording and playing service may be "audioflinger", and the pointer address of the audio recording and playing service on the terminal A may be "p_3". The service name of the audio policy service may be "audiopolicy", and the pointer address of the audio policy service on the terminal A may be "p_4".

The foregoing example shown in Table 1 is merely used to explain this application and shall not be construed as a limitation.

When the terminal A stores, in the database A, the service information of the distributed service on the terminal B, the database A may be shown in Table 2.

TABLE 2

| Device identifier | Service name of the distributed service | Pointer address of the distributed service |
|---|---|---|
| 0x01 | bluetooth | p_1 |
|  | location | p_2 |
|  | audioflinger | p_3 |
|  | audiopolicy | p_4 |
|  | ... | ... |
| 0x02 | bluetooth | t_1 |
|  | location | t_2 |
|  | mediaplayer | t_3 |
|  | Camera | t_4 |
|  | ... | ... |

It can be learned from the foregoing Table 2 that, the device identifier of the terminal B may be "0x02", and the distributed service on the terminal B may include a Bluetooth background management service, a location service, a media playing service, a camera service, and the like. The service name of the Bluetooth background management service may be "bluetooth", and the pointer address of the Bluetooth background management service on the terminal B may be "t_1". The service name of the location service may be "location", and the pointer address of the location service on the terminal B may be "t_2". The service name of the media playing service may be "mediaplayer", and the pointer address of the media playing service on the terminal B may be "t_3". The service name of the camera service may be "camera", and the pointer address of the camera service on the terminal B may be "t_4". The foregoing example shown in Table 2 is merely used to explain this application and shall not be construed as a limitation.

In a possible implementation, a same service name may correspond to a plurality of pointer addresses. For example, on some terminals, a plurality of Bluetooth background management services may be provided to an external device for invoking. Therefore, each of the service names of the plurality of Bluetooth background management services may be "bluetooth". However, the pointer addresses of the plurality of Bluetooth background management services are different, and one Bluetooth background management service corresponds to one pointer address.

S504: The terminal A obtains an invocation request for a first service.

The invocation request for the first service may be initiated by an application on the terminal A. For example, a map application on the terminal A may initiate an invocation request for a location service, to request to invoke the location service to return a GPS location.

In a possible implementation, the invocation request for the first service may alternatively be triggered by a user operation. For example, the terminal A may receive a playback operation performed by a user on a video. In response to the playback operation on the video, the terminal A may obtain an invocation request for a video playback service, to request to invoke the video playback service to play the video. The example is merely used to explain this application, and shall not constitute a limitation.

S505: When determining that the first service exists locally on the terminal A, the terminal A enables the first service, and executes the invocation request of the first service.

For example, the first service may be the location service, and the invocation request for the first service may be obtaining GPS location information. When the location service exists locally on the terminal A, the terminal A may enable the location service, to obtain the GPS location information.

S506: When determining that the first service does not exist locally on the terminal A, but querying, from the database A, that the first service exists on the terminal B, the terminal A sends the identifier information and the invocation request of the first service to the terminal B.

When the first service does not exist locally on the terminal A, the terminal A may query, from the database A, whether the service information of the first service exists. When the service information of the first service exists in the database A, the terminal A may determine, from the service information of the first service, the terminal on which the first service exists. When the first service exists on the terminal B, the terminal A may send the identifier information and the invocation request of the first service to the terminal B. The identifier information of the first service includes a service name and/or a pointer address of the first service.

For example, the first service may be the camera service. The invocation request may be used to request to invoke the camera service to return an image captured by a camera. The system service locally supported by the terminal A may include a power manager service (powermanagerservice), an activity manager service (activitymanagerservice), a telephony registry service (telephonyregistryservice), a content service (contentservice), a Bluetooth background management service (bluetoothservice), a location service (locationservice), and the like. The terminal A does not locally support the camera service. The database A on the terminal A includes the service information of the distributed service supported by the terminal B. The distributed service supported by the terminal B may include the Bluetooth background management service, the location service, the media playing service, the camera service, and the like. The terminal A may determine, by using the service management module 414 shown in FIG. 4B, whether the database A has the service information of the camera service. When the database A has the service information of the camera service, the service management module 414 may query the identifier information of the camera service from the database A. The camera service is on the terminal B. The terminal A may send the identifier information of the camera service and the invocation request for the camera service to the service agent module 426 on the terminal B by using the service agent module 416.

In a possible implementation, the database A on the terminal A includes service information of the distributed service supported by each of the plurality of terminals. For example, the database A may include service information of the distributed service supported by each of the terminal A, the terminal B, a terminal C, and a terminal D. If the terminal A determines, from the database A, that the plurality of terminals support the first service (for example, both the terminal B and the terminal C support the first service), the terminal A may determine, from the plurality of terminals supporting the first service and based on a historical record, a terminal in which the first service is invoked by the terminal A for a largest quantity of times within a preset time period (for example, in a last day, in a last month, or in a last month), and send the pointer address of the first service and the invocation request of the first service to the terminal in which the first service is invoked by the terminal A for the largest quantity of times.

For example, both the terminal B and the terminal C support the first service, and the terminal A invokes the first service on the terminal B for 10 times and invokes the first service on the terminal C once in the last month. The terminal A may send the pointer address of the first service and the invocation request of the first service to the terminal B. The example is merely used to explain this application, and shall not constitute a limitation.

In a possible implementation, the distributed service information may include the identifier information of the distributed service, the device identifier of the terminal on which the distributed service is located, and quality of service of the distributed service. If the terminal A determines, from the database A, that when the plurality of terminals support the first service (for example, both the terminal B and the terminal C support the first service), the terminal A may determine, from the plurality of terminals based on the quality of service of the distributed service, the second terminal with the highest quality of service of the first service.

In a possible implementation, if the terminal A determines, from the database A, that when the plurality of terminals support the first service (for example, both the terminal B and the terminal C support the first service), the terminal A may output an invocation prompt. The invocation prompt may be used to prompt the user to select a terminal that is invoked by the terminal A for the first service.

In a possible implementation, the terminal A receives an input operation that is specified by the user to invoke the first service on the terminal B. In response to the input operation, the terminal A may obtain the pointer address of the first service from the database, and send the pointer address and the invocation request of the first service to the terminal B. For example, the first service may be the video playback service. The terminal A may receive an input operation performed by the user on projection of a video to the terminal B. In response to the input operation, the terminal A may obtain the pointer address of the video playback service on the terminal B from the database, and send the pointer address and the invocation request of the video playback service to the terminal B. After enabling the video playback service, the terminal B may obtain playback data of the video from the terminal A and play the playback data. In a possible implementation, the invocation request may include a network storage path of the video. After receiving the invocation request, the terminal B may obtain the playback data of the video based on the network storage path of the video.

S507: The terminal B obtains the first service through matching based on the identifier information of the first service.

After receiving the identifier information that is sent by the terminal A and that is for the first service, the terminal B may obtain the first service through matching based on the identifier information of the first service.

S508: The terminal B executes the first service based on the invocation request.

S509: The terminal B returns, to the terminal A, a result of executing the first service based on the invocation request.

For example, the first service may be the camera service. The invocation request may be used to request to invoke the camera service to return the image captured by the camera. The terminal B may enable the camera service, enable the camera on the terminal B by using the camera service, and return, to the terminal A, the image shot by the camera on the terminal B. The foregoing example is merely used to explain this application and shall not be construed as a limitation. For specific content, refer to the embodiment shown in FIG. 4B. Details are not described herein again.

In some embodiments, the terminal A may set different types of service invocation permission for different terminals. When the distributed system includes three or more terminals, the terminal A may create a plurality of databases, and each database corresponds to one other terminal. Any database on the terminal A stores the service information of the distributed service that the terminal A allows the other terminal corresponding to the database to invoke. In this way, the terminal may set different types of service invocation permission for other different terminals, so that distributed service invocation by the plurality of terminals is more flexible.

For example, the distributed system may include the terminal A, the terminal B, the terminal C, and the terminal D. The terminal A may create a database 1, a database 2, and a database 3 separately. The database 1 may correspond to the terminal B, the database 2 may correspond to the terminal C, and the database 3 may correspond to the terminal D. The terminal A may allow the terminal B to invoke the location service, allow the terminal C to invoke the audio recording and playing service, and allow the terminal D to invoke the audio policy service. Therefore, the database 1 may include the service information of the location service on the terminal A and the service information of the distributed service on the terminal B. The database 2 may include the service information of the audio recording and playing service on the terminal A and the service information of the distributed service on the terminal C. The database 3 may include the service information of the audio policy service on the terminal A and the service information of the distributed service on the terminal D. The foregoing example is merely used to explain this application and shall not be construed as a limitation.

In this embodiment of this application, automatic synchronization of a distributed service list between terminal devices can be implemented, and precise cross-device access to a system service can be implemented. In addition, a developer does not need to pay attention to a service, so that system service invoking and resource sharing can be implemented for a plurality of terminal devices, to achieve capability complementation between terminal devices.

The following describes a procedure of database synchronization between terminals provided in an embodiment of this application.

Figure 6:
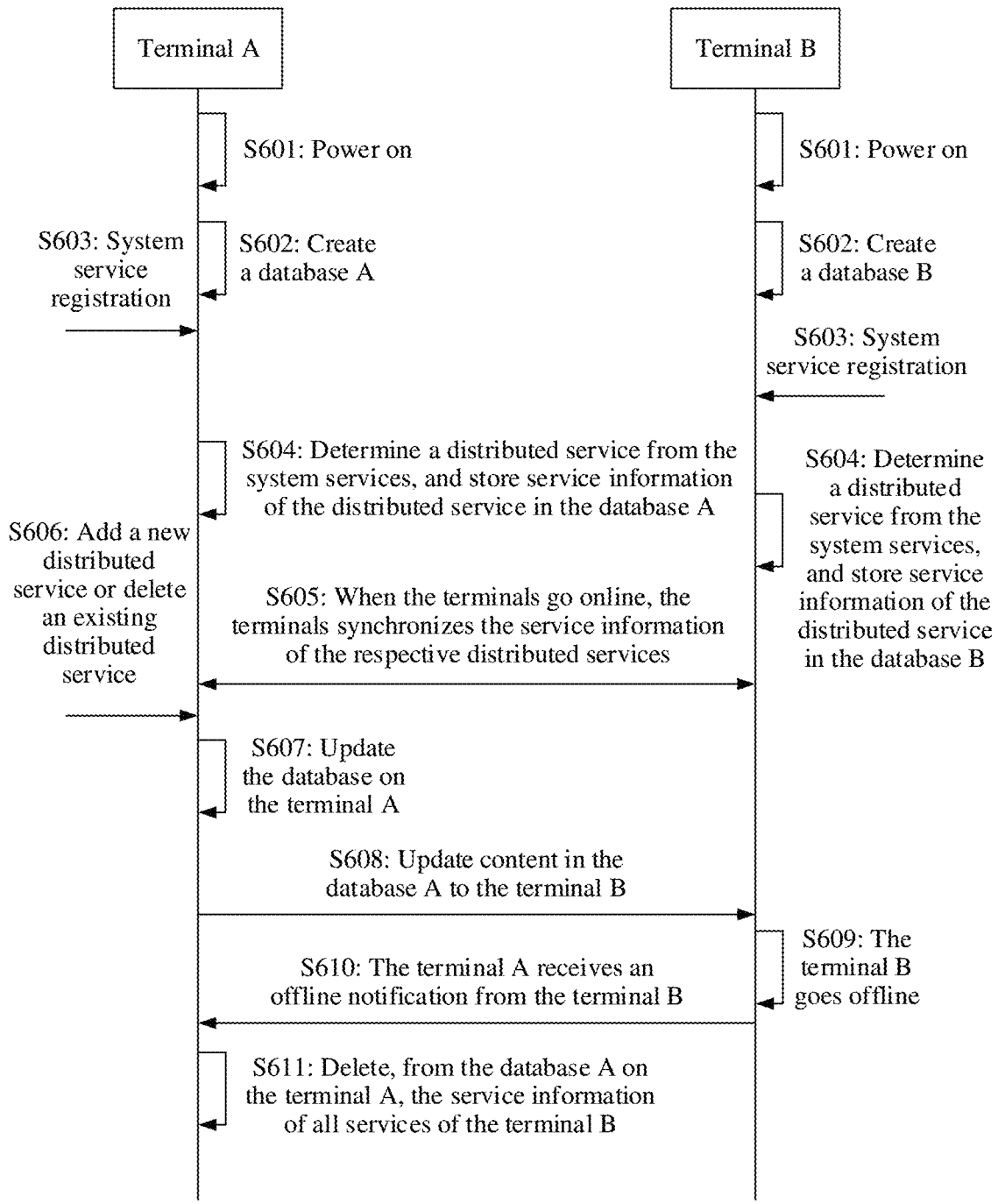
FIG. 6 is a schematic diagram of database synchronization between terminals according to an embodiment of this application.

FIG. 6 is a flowchart of a method for database synchronization between terminals according to this application. The method for database synchronization between terminals provided in this embodiment of this application may be applied to the distributed system in the foregoing embodiments. The distributed system may include a plurality of terminals. The plurality of terminals may be connected to a same network. For example, the plurality of terminals may be connected to a same local area network. In a possible implementation, a same system account may be logged in to the plurality of terminals. In a possible implementation, system accounts logged in to the plurality of terminals may all belong to a same account group. In this embodiment of this application, an example in which the distributed system includes two terminals (for example, a terminal A and a terminal B) is used to describe the method for database synchronization between terminals. The terminal A may be referred to as a first terminal, and the terminal B may be referred to as a second terminal.

As shown in FIG. 6, the method for database synchronization between terminals may include the following steps.

S601: The terminal A and the terminal B are powered on.

S602: The terminal A and the terminal B create respective databases. The database created by the terminal A may be referred to as a database A, and the database created by the terminal B may be referred to as a database B.

S603: The terminal A and the terminal B register respective system services.

S604: The terminal A and the terminal B determine respective distributed services from respective system services, and store service information of the respective distributed services in the respective databases.

The terminal A determines, from a local system service, a distributed service supported by the terminal A, and stores, in the database A, service information of the distributed service supported by the terminal A. The terminal B determines, from the local system service, a distributed service supported by the terminal B, and stores, in the database B, service information of the distributed service supported by the terminal B.

The distributed service is a service having a distributed identifier in the system service, and the system service having the distributed identifier may support remote invocation. The terminal may determine whether the system service has the distributed identifier. If the system service has the distributed identifier, the system service is a distributed service.

Service information of a plurality of distributed services may be stored in the database. The service information of the distributed service includes identifier information of the distributed service and a device identifier of the terminal on which the distributed service is located. The identifier information includes a service name and/or a pointer address. The pointer address of the distributed service is used to indicate a storage address that is on the terminal and that is of a service instance (that is, a resource for implementing the distributed service) of the distributed service.

S605: When the terminal A and the terminal B go online, the terminal A and the terminal B may synchronize the service information of the respective distributed services.

When the terminal A detects that the terminal B goes online, the terminal A may send the service information of the distributed service supported by the terminal A to the terminal B. When the terminal B detects that the terminal B goes online, the terminal B may send the service information of the distributed service supported by the terminal B to the terminal A.

S606: The terminal A adds a new distributed service or deletes an existing distributed service.

The terminal A may receive and respond to an input operation of a user, to add the new distributed service or delete the existing distributed service. In a possible implementation, a system account logged in to the terminal A and a system account logged in to the terminal B may belong to a same account group (for example, an account group "Huawei Home"). The terminal A may receive and respond to the input operation of the user, and set a system service that can be invoked by another terminal in the account group, for example, to add or delete the system service that can be invoked by the another terminal in the account group.

S607: When locally adding or deleting the distributed service, the terminal A updates the database A.

When the terminal A locally adds the new distributed service, the terminal A may store service information of the new distributed service in the database A. When the terminal A locally deletes the existing distributed service (for example, deletes the distributed identifier of the distributed service), the terminal A may delete service information of the existing distributed service from the database A.

S608: The terminal A updates content in the distributed database A to the terminal B.

When the database A on the terminal A is updated (for example, the service information of the distributed service is newly added or deleted), the terminal A may send updated content to the terminal B, and the terminal B updates the service information that is of the distributed service and that is updated by the terminal A, and stores, in the database B, the service information that is of the distributed service and that is updated by the terminal A. In a possible implementation, the terminal A may send, to the terminal B, the newly added service information of the distributed service. The terminal B may store, in the database, the newly added service information of the distributed service on the terminal A. Alternatively, the terminal A may send, to the terminal B, a service name of a distributed service that needs to be deleted. The terminal B may delete, from the database B based on the service name of the distributed service that needs to be deleted, service information of the distributed service that needs to be deleted by the terminal A. In a possible implementation, the terminal A may send, to the terminal B, the updated service information that is of the distributed service and that is in the database. The terminal B replaces the service information that is stored in the database B and that is of the distributed service supported by the terminal A with the updated service information of the distributed service on the terminal A.

S609: The terminal B goes offline.

S610: When going offline, the terminal B may send an offline notification to the terminal A.

S611: After receiving the offline notification of the terminal B, the terminal A deletes, from the database A, the service information of the distributed service supported by the terminal B.

In a possible implementation, after receiving the offline notification of the terminal B, the terminal A may identify the service information that is in the database A and that is of the distributed service supported by the terminal B as unavailable. When the terminal A obtains service information for a first service, the terminal A may query the service information of the first service from available service information that is in the database A and that is of the distributed service. After the terminal A receives a notification indicating that the terminal B goes online again, the terminal A may identify the service information that is in the database A and that is of the distributed service supported by the terminal B as available.

In this embodiment of this application, when a plurality of terminal devices are connected to a same distributed network, content in databases between the terminals can be automatically synchronized and updated, so that services between the terminals can be synchronously invoked. In addition, when accessing a service, an application does not need to know whether the service is accessed locally or by another device, thereby reducing development efficiency of an application developer, and reducing space for storing a system service by a terminal device in a distributed system.

The following describes, by using an example, an application scenario provided in a distributed service scheduling method provided in an embodiment of this application.

In some application scenarios, a terminal A and a terminal B are connected to a same local area network. A system service locally supported by the terminal A may include a power manager service, an activity manager service, a telephony registry service, a content service, a Bluetooth background management service, and the like. However, because a GPS positioning module of the terminal A is damaged or there is no GPS positioning module, the terminal A does not locally support a location service. When an application program on the terminal A needs to use the location service, the terminal A may query, from a local database, the location service supported by the terminal B. Therefore, the terminal A may send identifier information and an invocation request of the location service to the terminal B. After executing the location service based on the invocation request, the terminal B may send a result of executing the location service to the terminal A. Then, the terminal A provides the result of executing the location service by the terminal B to the application program that initiates the invocation.

Figure 7A:
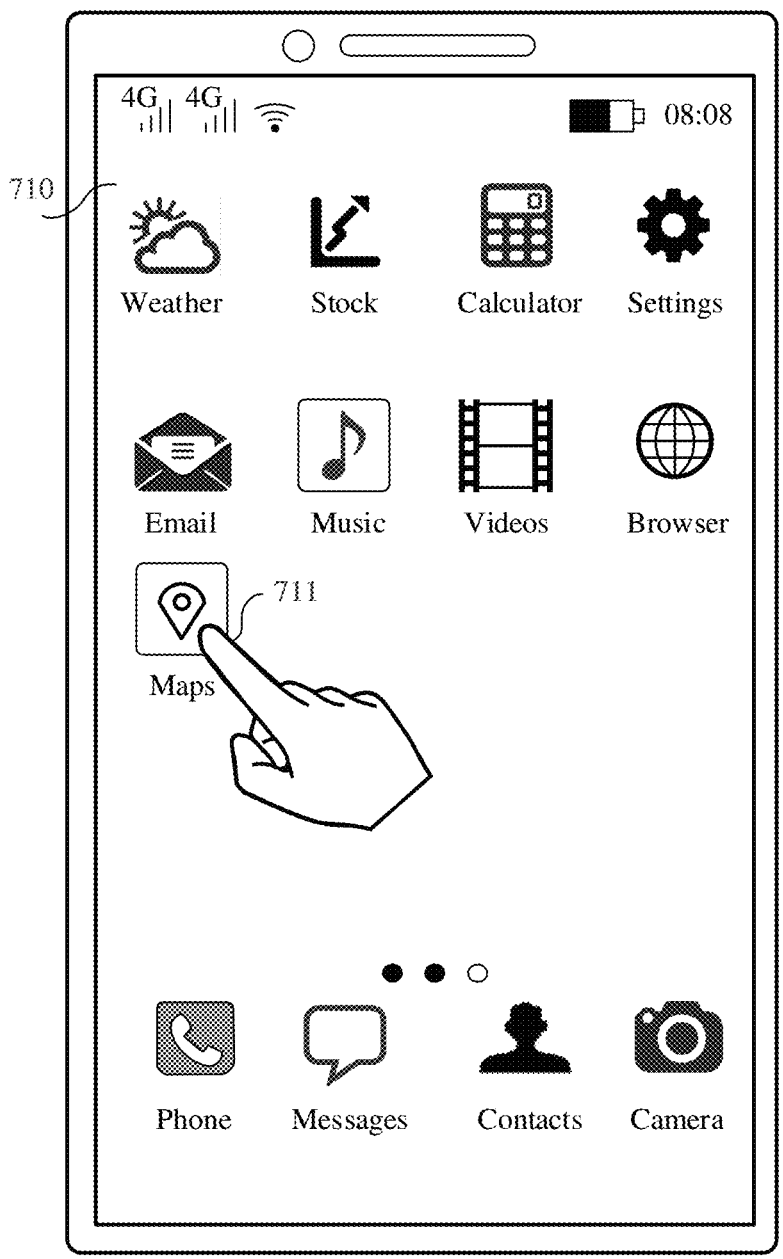
FIG. 7A to FIG. 7C are schematic diagrams of a group of scenario interfaces according to an embodiment of this application.

For example, as shown in FIG. 7A, the terminal A may display an interface 710 of a home screen. The interface 710 displays a page on which application icons are placed, and the page includes a plurality of application icons (for example, a Weather icon, a Stock icon, a Calculator icon, a Settings icon, an Email icon, a Music icon, a Videos icon, a Browser icon, and a Maps icon 711). A page indicator is further displayed below the plurality of application icons, to indicate a location relationship between the currently displayed page and another page. There are a plurality of tray icons (for example, a Phone application icon, a Messages application icon, a Contacts application icon, and a Camera application icon) below the page indicator, and the tray icons remain displayed during page switching.

The terminal A may receive an input operation (for example, tapping) performed by a user on the Maps icon 711. In response to the input operation, the terminal A may respond to the input operation, and the terminal A may display a map application interface 720 shown in FIG. 7B.

Figure 7B:
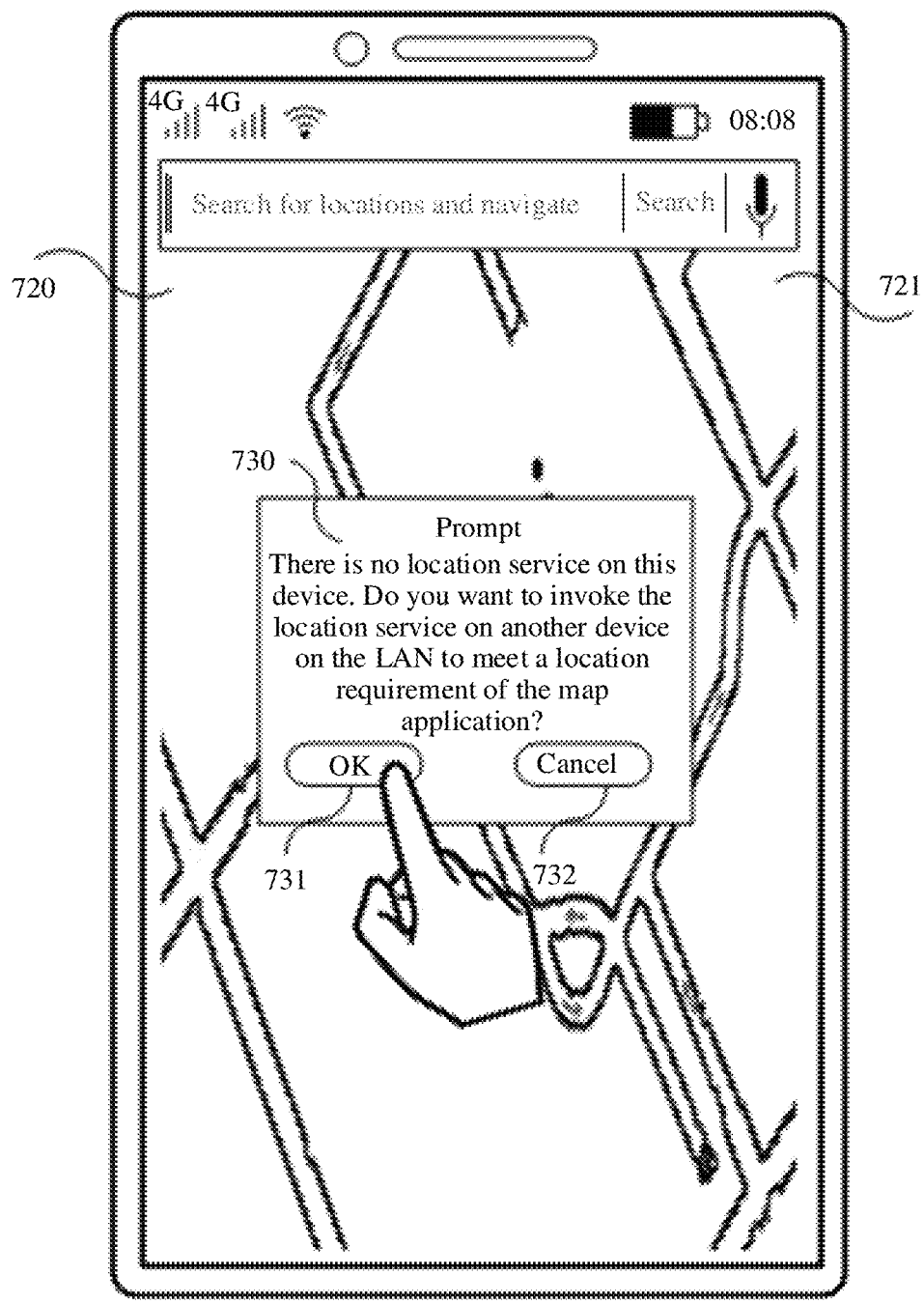

As shown in FIG. 7B, the terminal A displays the map application interface 720. The map application interface 720 includes a map 721 and a search box. When the terminal A receives the input operation, a map application on the terminal A may initiate the invocation request for the location service. When querying that the terminal A does not locally support the location service, the terminal A may output an invocation prompt window 730. The invocation prompt window 730 may be used to prompt the user to choose whether to invoke the location service on another device. For example, the invocation prompt window 730 may include a text prompt: "There is no location service on this device. Do you want to invoke the location service on another device on the LAN to meet a location requirement of the map application?". The invocation prompt window 730 may include an OK button 731 and a Cancel button 732. The OK button 731 may be used to trigger the terminal A to invoke the location service on the terminal B. The Cancel button 732 may be used to trigger the terminal A to cancel invoking of the location service on the terminal B.

The terminal A may receive an input operation (for example, tapping) performed by the user on the OK button 731. In response to the input operation, the terminal A may query, from the database A in the foregoing embodiments, the service information of the location service supported by the terminal B on the same local area network, and send the identifier information and the invocation request of the location service to the terminal B. The terminal B may obtain the location service through matching based on the identifier information of the location service sent by the terminal A, and execute the location service based on the invocation request. For example, the terminal B may execute the location service to obtain location information of the terminal B, and send the location information of the terminal B to the terminal A. After receiving the location information sent by the terminal B, the terminal A may provide the location information for the map application.

Figure 7C:
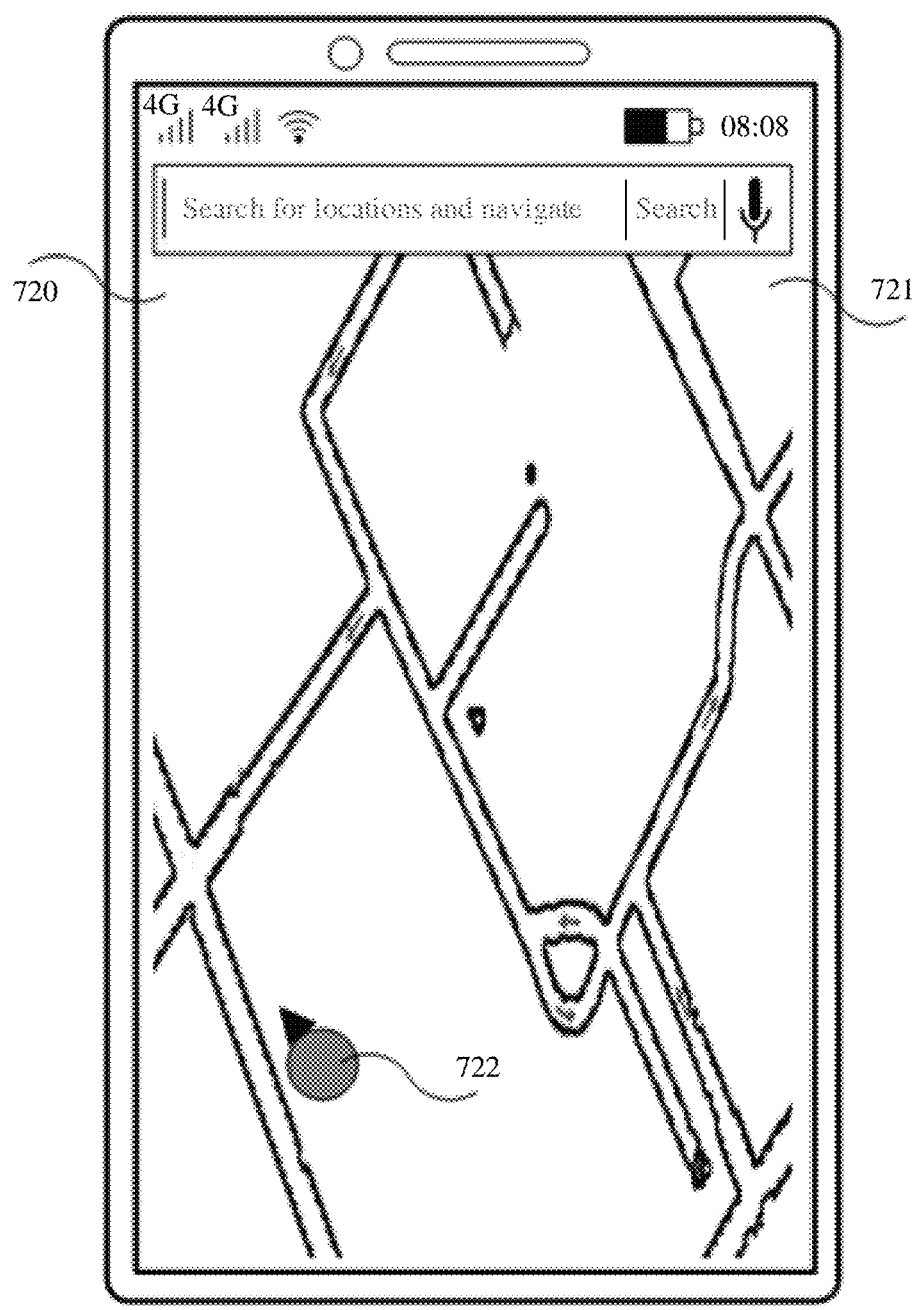

As shown in FIG. 7C, after the map application on the terminal A obtains the location information sent by the terminal B, the terminal A may use the location information of the terminal B as location information of the terminal A, and display, on a map on the gallery application interface 720, a mark 722 of a location where the terminal A is located.

The foregoing example is merely used to explain this application and shall not be construed as a limitation.

In this embodiment of this application, an application scenario of distributed service scheduling may include a one-time service invocation scenario and a long-time service invocation scenario.

1. In the one-time service invocation scenario, for example, the terminal A may be a mobile phone, and the terminal B may be a large-screen device. When the terminal A and the terminal B are connected to each other, if the terminal A needs to enable an application (for example, a music application) on the terminal B, the first service invoked by the terminal A may be a component management service on the terminal B. The terminal A may send identifier information and an invocation request of the component management service to the terminal B. The invocation request may include an application package name and a startup component name (for example, a search page of the music application) that correspond to the application (for example, the music application) to be enabled on the terminal B. After receiving the identifier information and the invocation request of the component management service, the terminal B may enable, based on the application package name and the startup component name in the invocation request, the application (for example, the music application) corresponding to the application package name, and trigger a component (for example, the search page of the music application) corresponding to the startup component name in the application. When the component is started, an invocation process of the terminal A ends.

2. In a scenario in which service invocation is interacted for a long time, for example, the terminal A may be a mobile phone, and the terminal B may be a stereo. When the terminal A and the terminal B are connected to each other, the terminal A may control playing on the terminal B by using a control page. The first service invoked by the terminal A may be an audio service on the terminal B. The terminal A may send identifier information and an invocation request of the audio service to the terminal B. The invocation request may include a handle name of the audio service. After receiving the identifier information and the invocation request of the audio service, the terminal B may obtain a handle of the audio service based on the handle name of the audio service in the invocation request, and then send the handle of the audio service to the terminal A. The terminal A may control music playing, pausing, previous or next piece of music based on the handle.

In conclusion, the foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A distributed service scheduling method, comprising:
obtaining, by a first terminal, an invocation request for a first service;
determining, by the first terminal, whether the first terminal locally supports the first service, wherein a local database comprises service information of one or more distributed services, and wherein the service information comprises identifier information of a distributed service of the one or more distributed services and a device identifier of a terminal on which the distributed service is located; and if the first terminal does not locally support the first service,
determining, by the first service, in response to the first terminal not locally supporting the first service, whether a local database comprises service information of the first service; or if the first terminal locally supports the first service,
determining, by the first terminal from the local database, in response to the first terminal locally supporting the first service, identifier information of the first service and a second terminal that supports the first service; wherein the local database comprises service information of one or more distributed services, and the service information comprises identifier information of the distributed service and a device identifier of a terminal on which the distributed service is located;
sending, by the first terminal, the identifier information of the first service and the invocation request to the second terminal, wherein the identifier information of the first service is used by the second terminal to match the first service; and
receiving, by the first terminal, a result of executing the first service by the second terminal based on the invocation request.

2. The method according to claim 1, wherein the method further comprises:
locally executing, by the first terminal, in response to the first terminal locally supporting the first service, the first service based on the invocation request.

3. The method according to claim 1, further comprising performing, before the obtaining, by the first terminal, the invocation request for the first service:
determining, by the first terminal from one or more system services on the first terminal, a distributed service supported by the first terminal; and
storing, in the local database, the service information of the distributed service supported by the first terminal, wherein the distributed service is the system service having a distributed identifier.

4. The method according to claim 3, further comprising performing, before the obtaining, by the first terminal, the invocation request for the first service:
sending, by the first terminal, the service information of the distributed service supported by the first terminal to the second terminal.

5. The method according to claim 1, further comprising performing, before the obtaining, by the first terminal, the invocation request for the first service:
receiving, by the first terminal, service information that is sent by the second terminal and that is of a distributed service supported by the second terminal; and
storing, by the first terminal in the local database, the service information of the distributed service supported by the second terminal.

6. The method according to claim 1, wherein the determining, by the first terminal from the local database, the identifier information of the first service and the second terminal that supports the first service comprises:
determining, by the first terminal from the local database, a plurality of terminals that support the first service;
determining, by the first terminal, the second terminal from the plurality of terminals; and
determining, by the first terminal from the local database, the identifier information of the first service supported by the second terminal.

7. The method according to claim 6, wherein the determining, by the first terminal, the second terminal from the plurality of terminals comprises:
determining, by the first terminal from the plurality of terminals based on a historical record, the second terminal to be a terminal, of the plurality of terminals, in which the first service is invoked for a largest quantity of times within a preset time period.

8. The method according to claim 6, wherein the service information further comprises quality of service of the distributed service; and
wherein the determining, by the first terminal, the second terminal from the plurality of terminals comprises:
determining, by the first terminal from the plurality of terminals based on the quality of service of the distributed service, the second terminal a terminal, of the plurality of terminals, with highest quality of service of the first service.

9. The method according to claim 6, wherein the determining, by the first terminal, the second terminal from the plurality of terminals comprises:
outputting, by the first terminal, an invocation prompt, wherein the invocation prompt is used to prompt prompts a user to select the second terminal from the plurality of terminals;
receiving, by the first terminal, a selection operation performed by the user on the second terminal; and
determining, by the first terminal, the second terminal in response to the selection operation.

10. The method according to claim 1, wherein the first terminal does not locally support the first service when the first service does not exist locally on the first terminal; or the first terminal does not locally support the first service when the first service exists locally on the first terminal and the first service is occupied.

11. The method according to claim 1, further comprising:
deleting, by the first terminal from the local database, in response to the first terminal detecting that the second terminal is offline, the service information of the distributed service supported by the second terminal.

12. The method according to claim 1, wherein the identifier information comprises at least one of a service name and/or or a pointer address of the distributed service.

13. A terminal, wherein the terminal is a first terminal, and wherein the terminal comprises:
a processor; and
a non-transitory computer readable medium storing a program for execution by the processor, the program having instructions for running an application program, a service management module, and a communication module, wherein the instructions include instructions for:
- causing the application program to initiate an invocation request for a first service to the service management module;
- causing the service management module to:
  - determine whether the first terminal locally supports the first service, wherein a local database comprises service information of one or more distributed services, and wherein the service information comprises identifier information of a distributed service of the one or more distributed services and a device identifier of the terminal on which the distributed service is located;
  - determine, in response to the first terminal not locally supporting the first service, whether the local database comprises service information of the first service;
  - determine, from the local database, in response to the first terminal locally supporting the first service, identifier information of the first service and a second terminal that supports the first service, wherein the local database comprises service information of one or more distributed services, and the service information comprises identifier information of the distributed service and a device identifier of the terminal on which the distributed service is located;
- causing the communication module to send the identifier information of the first service and the invocation request to the second terminal, wherein the identifier information of the first service is used by the second terminal to match the first service;
- causing the communication module to receive a result of executing the first service by the second terminal based on the invocation request; and
- causing the communication module to return the result to the application program.

14. The terminal according to claim 13, wherein the instructions further include instructions for causing the service management module to locally execute the first service in response to the first terminal locally supporting the first service.

15. The terminal according to claim 13, wherein the instructions further include instructions for causing the service management module to perform, before the application program initiates the invocation request for the first service to the service management module:
- determine, from one or more system services on the first terminal, a distributed service supported by the first terminal; and
- store, in the local database, service information of the distributed service supported by the first terminal, wherein the distributed service is a system service, of the one or more system services, having a distributed identifier.

16. The terminal according to claim 15, wherein the instructions further include instructions for causing the communication module to perform, before the application program initiates the invocation request for the first service to the service management module, send the service information of the distributed service supported by the first terminal to the second terminal.

17. The terminal according to claim 13, wherein the instructions further include instructions for causing the communication module to perform, before the application program initiates the invocation request for the first service to the service management module, receive the service information that is sent by the second terminal and that is of a distributed service supported by the second terminal; and
wherein the instructions further include instructions for causing the service management module to store, in the local database, the service information of the distributed service supported by the second terminal.

18. The terminal according to claim 13, wherein the instructions causing the service management module to determine, from the local database, the identifier information of the first service and the second terminal that supports the first service include instructions causing the service management module to:
- determine, from the local database, a plurality of devices that support the first service;
- determine the second terminal from the plurality of devices; and
- determine, from the local database, the identifier information of the first service supported by the second terminal.

19. The terminal according to claim 18, wherein the instructions causing the service management module to determine the second terminal from the plurality of devices include instructions causing the service management module to:
- determine, from the plurality of devices based on a historical record, the second terminal to be a terminal, of the plurality of devices, in which the first service is invoked for a largest quantity of times within a preset time period.

20. A non-transitory computer storage medium, comprising having computer instructions stored thereon for execution on a first terminal, wherein the computer instructions include instructions for:
- obtaining, by the first terminal, an invocation request for a first service;
- determining, by the first terminal, whether the first terminal locally supports the first service, wherein a local database comprises service information of one or more distributed services, and wherein the service information comprises identifier information of a distributed service of the one or more distributed services and a device identifier of a terminal on which the distributed service is located;
- determining, by the first service, in response to the first terminal not locally supporting the first service, whether a local database comprises service information of the first service;
- determining, by the first terminal from the local database, in response to the first terminal locally supporting the first service, identifier information of the first service and a second terminal that supports the first service;
- sending, by the first terminal, the identifier information of the first service and the invocation request to the second terminal, wherein the identifier information of the first service is used by the second terminal to match the first service; and
- receiving, by the first terminal, a result of executing the first service by the second terminal based on the invocation request.

* * * * *

UNITED STATES PATENT AND TRADEMARK OFFICE
CERTIFICATE OF CORRECTION

PATENT NO. : 11,831,713 B2
APPLICATION NO. : 17/802717
DATED : November 28, 2023
INVENTOR(S) : Gong et al.

It is certified that error appears in the above-identified patent and that said Letters Patent is hereby corrected as shown below:

In the Claims

In Column 33, in Claim 1, Line 30, delete "service;" and insert -- service, --.

Signed and Sealed this
Sixth Day of February, 2024

Katherine Kelly Vidal
*Director of the United States Patent and Trademark Office*